US012104019B2

(12) United States Patent
Courtemanche et al.

(10) Patent No.: US 12,104,019 B2
(45) Date of Patent: Oct. 1, 2024

(54) BRIDGED FRUSTRATED LEWIS PAIRS AS THERMAL TRIGGER FOR REACTIONS BETWEEN Si—H AND ALPHA-BETA UNSATURATED ESTERS

(71) Applicant: Dow Silicones Corporation, Midland, MI (US)

(72) Inventors: Marc-Andre Courtemanche, Midland, MI (US); Eun Sil Jang, Columbus, OH (US); Yanhu Wei, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 554 days.

(21) Appl. No.: 17/601,723

(22) PCT Filed: Jun. 2, 2020

(86) PCT No.: PCT/US2020/035642
§ 371 (c)(1),
(2) Date: Oct. 6, 2021

(87) PCT Pub. No.: WO2020/247335
PCT Pub. Date: Dec. 10, 2020

(65) Prior Publication Data
US 2022/0169795 A1 Jun. 2, 2022

Related U.S. Application Data

(60) Provisional application No. 62/856,773, filed on Jun. 4, 2019.

(51) Int. Cl.
*C08G 77/06* (2006.01)
*C07F 7/18* (2006.01)
*C08G 77/12* (2006.01)
*C08G 77/20* (2006.01)

(52) U.S. Cl.
CPC ............ *C08G 77/06* (2013.01); *C07F 7/1804* (2013.01); *C08G 77/12* (2013.01); *C08G 77/20* (2013.01)

(58) Field of Classification Search
None
See application file for complete search history.

(56) References Cited

U.S. PATENT DOCUMENTS

| | | | |
|---|---|---|---|
| 4,254,271 A | 3/1981 | Finke et al. | |
| 5,721,290 A | 2/1998 | Eckberg et al. | |
| 5,866,261 A | 2/1999 | Kerr, III et al. | |
| 6,218,445 B1 | 4/2001 | Priou et al. | |
| 6,548,568 B1 | 4/2003 | Pinto et al. | |
| 6,777,512 B1 | 8/2004 | Sonnenschein et al. | |
| 7,064,173 B2 | 6/2006 | Rubinsztajn et al. | |
| 7,906,605 B2 | 3/2011 | Cray et al. | |
| 8,048,819 B2 | 11/2011 | Rubinsztajn et al. | |
| 8,470,899 B2 | 6/2013 | Maliverney | |
| 8,629,222 B2 | 1/2014 | Takizawa et al. | |
| 8,968,868 B2 | 3/2015 | Yang et al. | |
| 9,006,336 B2 | 4/2015 | Yang et al. | |
| 9,006,357 B2 | 4/2015 | Yang et al. | |
| 9,035,008 B2 | 5/2015 | Yang et al. | |
| 9,624,154 B2 | 4/2017 | Blair | |
| 9,856,194 B2 | 1/2018 | Fontaine et al. | |
| 10,259,908 B2 | 4/2019 | Arkles et al. | |
| 2003/0139287 A1 | 7/2003 | Deforth et al. | |
| 2005/0136269 A1 | 6/2005 | Doehler et al. | |
| 2006/0211836 A1 | 9/2006 | Rubinsztajn et al. | |
| 2006/0241271 A1 | 10/2006 | Rubinsztajn et al. | |
| 2006/0280957 A1 | 12/2006 | Lee et al. | |
| 2006/0293172 A1 | 12/2006 | Rubinsztajn et al. | |
| 2008/0281469 A1 | 11/2008 | Choi et al. | |
| 2009/0192282 A1 | 7/2009 | Janvikul et al. | |
| 2010/0144960 A1 | 6/2010 | Cray et al. | |
| 2013/0234070 A1 | 9/2013 | Mowrer | |
| 2015/0141570 A1 | 5/2015 | Buckanin et al. | |
| 2015/0376481 A1 | 12/2015 | Larson et al. | |
| 2016/0289388 A1 | 10/2016 | Fu et al. | |
| 2016/0319081 A1 | 11/2016 | Kumar et al. | |
| 2019/0031932 A1 | 1/2019 | Zhang et al. | |
| 2019/0062467 A1* | 2/2019 | Knaus | C08F 4/52 |

FOREIGN PATENT DOCUMENTS

| | | | |
|---|---|---|---|
| CA | 2894146 A1 | 6/2014 | |
| CN | 1989178 A | 6/2007 | |
| CN | 104877310 A | 9/2015 | |
| FR | 2824835 A1 | 11/2002 | |
| WO | 2008125911 A2 | 10/2008 | |
| WO | 2011045605 A1 | 4/2011 | |
| WO | 2012060449 A1 | 5/2012 | |
| WO | 2013142956 A1 | 10/2013 | |
| WO | 2016097734 A1 | 6/2016 | |
| WO | 2016168914 A1 | 10/2016 | |
| WO | 2017100904 A1 | 6/2017 | |

(Continued)

OTHER PUBLICATIONS

Grande, "Testing the functional tolerance of the Piers-Rubinsztajin reaction: a new strategy for functional silicones", Chem. Comm., 2010, pp. 4988-4990, vol. 46.
Kamino, et. al., "Siloxane-Triarylamine Hybrids: Discrete Room Temperature Liquid Triarylamines via the Piers-Rubinsztajn Reaction" Organic Letters, 2011, pp. 154-157, vol. 13, No. 1.
Voss, et. al., "Frustrated Lewis Pair Behavior of Intermolecular Amine/B(C6F5)3 Pairs" Organometallics, 2012, pp. 2367-2378, vol. 31.
Stephan, et. al., "Frustrated Lewis Pairs: Metal-free Hydrogen Activation and More" Angew. Chem. Int. Ed., 2010, pp. 46-76, vol. 49.
Asenjo-Sanz et al., "Zwitterionic Polymerization of Glycidyl Monomers to Cyclic Polyethers with B(C6F5)3" The Royal Society of Chemistry, 2012 pp. 1-5.
Berkefeld, "Tandem Frustrated Lewis Pair/Trisborane-Catalyzed Deoxygenative Hydrosilylation of Carbon Dioxide", JACS, 2010, pp. 10060-10661, vol. 132.

(Continued)

*Primary Examiner* — Rachel Kahn
(74) *Attorney, Agent, or Firm* — Catherine U. Brown; Steve W. Mork

(57) ABSTRACT

A composition contains an alpha-beta unsaturated ester, a silyl hydride, and a Bridged Frustrated Lewis Pair.

20 Claims, No Drawings

(56) References Cited

FOREIGN PATENT DOCUMENTS

| WO | 2019070866 A1 | 4/2019 |
|---|---|---|
| WO | 2020247337 A1 | 12/2020 |

OTHER PUBLICATIONS

Brook, "New Control Over Silicone Synthesis using SiH Chemistry: The Piers-Rubinsztajn Reaction", Chem. Eur. J., 2018, pp. 8458-8469, vol. 24.

Cella, "Preparation of Polyaryloxysilanes and Polyaryloxysiloxanes by B(C6F5)3 Catalyzed Polyetherification of Dihydrosilanes and Bis-Phenols", Macromolecules, 2008, pp. 6965-6971, vol. 41.

Chakraborty et al., "Catalytic Ring-Opening Polymerization of Propylene Oxide by Organoborane and Aluminum Lewis Acids" Macromolecules, 2003, pp. 5470-5481.

Chen et al., "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, pp. 844-856, vol. 52.

Chojnowski et al., "Mechanism of the B(C6F5)3-Catalyzed Reaction of silyl Hydrides with Alkoxysilanes. Kinetic and Spectroscopic Studies" Organometallics, 2005, vol. 24, pp. 6077-6084.

Chojnowski, "Hydride Tranfer Ring-Opening Polymerization of a Cyclic Oligomethylhydrosiloxane. Route to a Polymer of Closed Multicyclic Structure", Macromolecules, 2012, pp. 2654-2661, vol. 45.

Chojnowski, "Oligomerization of Hydrosiloxanes in the Presence of Trisborane", Macromolecules, 2006, pp. 3802-3807, vol. 39.

Fawcett et al., "Rapid, Metal-Free Room Temperature Vulcanization Produces Silicone Elastomers" J. Polym. Sci. A Polym. Chem., 2013, vol. 51, pp. 644-652.

Fuchise, "B(C6F5)3-Catalyzed Group Transfer Polymerization of n-Butyl Acrylate with Hydrosilane through In Situ Formation of Initiator by 1,4-Hydrosilylation of n-Butyl Acrylate", ACS Macro Lett., 2014, pp. 1015-1019, vol. 3.

Herzberger et al., "Polymerization of Ethylene Oxide, Propylene Oxide, and Other Alkylene Oxides: Synthesis, Novel Polymer Architectures, and Bioconjugation" Chemical Reviews, American Chemical Society, 2016, pp. 2170-2243.

Hoque, "Polysiloxanes with Periodically Distrubuted Isomeric Double-Decker Silsesquioxane in the Main Chain", Macromolecules, 2009, pp. 3309-3315, vol. 42.

Khalimon et al., "A Photo Lewis Acid Generator (PhLAG): Controlled Photorelease of B(C6F5)3", JACS, 2012, pp. 9601-9604, vol. 134.

Khalimon, "Photo Lewis acid generators: photorelease of B(C6F5)3 and applications to catalysis", Dalt. Trans., 2015, pp. 18196-18206, vol. 44.

Kim, "Metal-Free Hydrosilylation Polymerization by Borane Catalyst", Angew. Chem. Int. Ed, 2015, pp. 14805-14809, vol. 54.

Lambert et al., "A Stable B-Silyl Carbocation", J. Am. Chem. Soc., 1996, vol. 118, pp. 7867-7868.

Lambert et al., "B-Silyl and B-Germyl Carbocations Stable at Room Temperature", J. Org. Chem., 1999, vol. 64, pp. 2729-2736.

Matsumoto et al., "One-Pot Sequence-Controlled Synthesis of Oligosiloxanes" Angew. Chem. Int. Ed. 2018, vol. 57, pp. 4637-4641.

Mitsuo, "NewHorizon of Organosilicon Chemistry", Dalt. Trans., 2010, pp. 9369-9378, vol. 39.

Momming, "Reversible Metal-Free Carbon Dioxide Binding by Frustrated Lewis Paris", Angew. Chem. Int. Ed., 2009, pp. 6643-6646, vol. 48.

Oertle et al., "Hydrosilylation of tetrasubstituted Olefins" Tetrahedron Lett., 1985, vol. 26, pp. 5511-5514.

Oestreich, "A unified survey of Si—H and H—H bond activation catalysed by electron-deficient boranes", Chem. Soc. Rev., 2015, pp. 2202-2220, vol. 44.

Perez et al., "Olefin Isomerization and Hydrosilylation Catalysis by Lewis Acidic Organofluorophosphonium Salts" J. Am. Chem. Soc., 2013, 135, 18308.

Piers et al., "Mechanistic Aspects of Bond Activation with Perfluoroarylboranes", Inorg. Chem., 2011, vol. 50, pp. 12252-12262.

Rubin et al., "Highly Efficient B(C6F5)3-Catalyzed Hydrosilylation of Olefins" J. Org. Chem, 2020, vol. 67, pp. 1936-1940.

Simonneau et al., "3-Silylated Cyclohexa-1,4-dienes as Precursors for Gaseous; Hydrosilanes: The B(C6F5)3-Catalyzed Transfer Hydrosilylation of; Alkenes" Angew. Chem. Int. Ed., 2013, vol. 52, pp. 11905-11907.

Song et al., "Lewis Acid-Catalyzed Regio- and Stereoselective Hyddrosiylation of Alkenes with Trialkylsilanes" Organometallics, 1999, vol. 18, pp. 3109-3115.

Stephan, "Frustrated Lewis Pair Chemistry: Development and Perspectives", Angew. Chem. Int. Ed., 2015, pp. 6400-6441, vol. 54.

Stephan, "Frustrated Lewis Pairs", JACS, 2015, pp. 10018-10032, vol. 137.

Yamamoto et al., "Sterochemistry of Aluminum Chloride Catalyzed Hydrosilylation of Methylcyclohexenes" Synlett, 1990, pp. 259-260.

Zhang, "Piers' borane-mediated hydrosilylation of epoxides and cyclic ethers", Chem. Commun., 2018, pp. 7243-7246, vol. 54.

Zhao et al., "N-Heterocyclic Carbene-Catalysed Hydrosilylation of Styryl and Propargylic Alcohols with Dihydrosilanes" Chem. Eur. J., 2011, vol. 17, pp. 9911-9914.

* cited by examiner

BRIDGED FRUSTRATED LEWIS PAIRS AS THERMAL TRIGGER FOR REACTIONS BETWEEN Si—H AND ALPHA-BETA UNSATURATED ESTERS

CROSS REFERENCE TO RELATED APPLICATIONS

This application is a U.S. national stage filing under 35 U.S.C. § 371 of PCT Application No. PCT/US20/035642 filed on 2 Jun. 2020, which claims the benefit of U.S. Provisional Patent Application No. 62/856,773 filed 4 Jun. 2019 under 35 U.S.C. § 119 (e). PCT Application No. PCT/US20/035642 and U.S. Provisional Patent Application No. 62/856,773 are hereby incorporated by reference.

BACKGROUND OF THE INVENTION

Field of the Invention

The present invention relates to use of a bridged frustrated Lewis pair as a thermal trigger for chemical reaction between silyl hydrides and alpha-beta unsaturated esters. The bridged frustrated Lewis pair dissociates to release a Lewis acid upon heating. The Lewis acid serves as a catalyst for the chemical reaction between silyl hydrides and alpha-beta unsaturated esters.

Introduction

Frustrated Lewis Pairs ("FLPs") is a term that refers to pairs of Lewis acids and Lewis bases in which steric congestion precludes the Lewis acid and Lewis base from complexing and neutralizing each other. When combined, the Lewis acids and bases of FLPs remain independent from one another rather than combine to neutralize one another. Yet, FLPs have been found to bind indirectly to one another in the form of Bridged Frustrated Lewis Pairs ("B-FLPs"), where a bridging molecule is bound to both the acid and the base of a FLP to create a complex with the bridging molecule between the Lewis acid and Lewis base. In some instances, the bridging molecule can sever to create a blocked Lewis acid and a blocked Lewis base with a portion of the bridging molecule complexed with and blocking each of the Lewis acid and Lewis base from further complexing or reacting. Hydrogen ($H_2$) is an example of a bridging molecule that severs in such a manner upon forming a B-FLP.

B-FLPs have been used to activate the bridging molecule for use in chemical reactions. For example, hydrogen ($H_2$) has been used as a bridging molecule in a B-FLP in order to activate the hydrogen for use in hydrogenation reactions (See, for example, JACS 2015, 137, 10018-10032) and carbon dioxide has been used as a bridging molecules in B-FLP in order to activate the carbon dioxide for deoxygenative hydrosilylation (See, for example, JACS 2010, 132, 10660-10661). Other molecules used as bridging molecules in a B-FLP for use in activating them for chemical reactions include nitrous oxide ($N_2O$), sulfur dioxide ($SO_2$), alkenes and alkynes. See, for example: Angew. Chem. Int. Ed. 2009, 48, 6643-6646; Angew. Chem. Int. Ed. 2015, 54, 6400-6441; and JACS 2015, 137, 10018-10032.

It would be surprising and useful to discover additional uses for B-FLPs, particularly if such uses allow control over chemical reactions other than those involving the bridging molecule.

BRIEF SUMMARY OF THE INVENTION

The present invention offers a surprising and unexpected use for B-FLPs as thermal triggers for reductive cure reactions between silyl hydride (Si—H) and alpha-beta unsaturated esters in a reaction that does not require transition metal catalysts like hydrosilylation.

Hydrosilylation reactions are one method of reacting silyl hydride and unsaturated bonds in a curing reaction. Hydrosilylation typically requires the presence of a transition metal catalyst which tends to undesirably remain in the reaction product. However, it has been discovered that silyl hydride and alpha-beta unsaturated esters undergo a reductive cure reaction in the presence of a Lewis acid catalyst without the need for a transition metal catalyst. The reductive cure reaction between silyl hydride and alpha-beta unsaturated esters is an addition reaction that either adds a silicon to the carbonyl oxygen of an alpha-beta unsaturated ester to generate a new silyl ether bond or adds a silicon to the alpha-carbon of the alpha-beta unsaturated ester to form a new silicon-carbon bond. The reaction produces these addition products without generating any byproducts besides the new addition products, particularly gaseous materials. It also offers benefits of providing an addition reaction that does not require expensive platinum catalysts and that is mild and faster than platinum-catalyzed hydrosilylation.

The Lewis acid catalyzed reductive cure of silyl hydride and alpha-beta unsaturated esters can be desirable for curing siloxanes in coating, adhesive, and sealant applications. However, the reductive cure reaction tends to be rapid so it requires supplying and storing the reactive systems as two-part systems where the catalyst is kept apart from the Si—H and/or the alpha-beta unsaturated esters until reaction is desired. One-component systems are more easily handled and are desirable over two-part systems, so it is desirable if reaction components could be stored together in a one-part system in a way that provides shelf stability for storage but had a way to trigger the reductive cure reaction when desired to cure the system.

The present invention is a result of discovering that B-FLPs can be used in silyl hydride/alpha-beta unsaturated ester reductive cure reaction systems as latent Lewis acid catalysts which are triggered thermally. That is, a B-FLP comprising a Lewis acid catalyst can be combined with a silyl hydride and an alpha-beta unsaturated esters to form a one-part reactive system that is shelf stable at 23° C. but that reacts quickly when heated to release the Lewis acid from the B-FLP. When heated, the Lewis acid dissociates from the B-FLP, allowing the Lewis acid to act as a reaction catalyst to initiate the addition reaction between the silyl hydride and alpha-beta unsaturated ester. Desirably, compositions of the present invention can be exposed to UV light without triggering the reaction by unblocking the Lewis acid.

B-FLPs have been found to be particularly efficient triggering agents because once broken they are unlikely to recombine. That means that once the Lewis acid is freed it will continue to catalyze the reaction without inhibition by reformation of the B-FLP. That is an advantage over Lewis acids inhibited with Lewis base directly because the Lewis base remains in solution and can recombine with a free Lewis acid to neutralize the Lewis acid. B-FLPs require reformation of a bridged complex between the Lewis acid and base, which is much less likely to randomly occur. This is particularly true with fugitive bridging molecules such as those that are gaseous and escape the reaction system once the B-FLP is broken. As a result, use of a B-FLP offers unprecedented control over irreversibly triggering the reaction without interference form a catalyst inhibitor because when heated sufficiently to dissociate the B-FLP, the acid catalyst is expected to be essentially irreversibly released to catalyze the rapid reaction.

In a first aspect, the present invention is composition comprising a mixture of silyl hydride, an alpha-beta unsaturated ester, and a Bridged Frustrated Lewis Pair.

In a second aspect, the present invention is a chemical reaction process comprising the steps of: (a) providing a composition of the first aspect; and (b) heating the composition to a temperature sufficient to dissociate the Lewis acid from the Bridged Frustrated Lewis Pair.

The present invention is useful for preparing coatings, adhesives, and elastomers.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standardization.

Products identified by their tradename refer to the compositions available from the suppliers under those tradenames on the priority data of this application.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

The composition of the present invention comprises a mixture of a silyl hydride, an alpha-beta unsaturated ester, and a Bridged Frustrated Lewis Pair.

"Alpha-beta unsaturated ester" refers to a molecule that contains an ester group and a double bond between the alpha and beta carbons in the chain, where the carbon atoms are named based on their proximity to the carbonyl group of the ester. Acrylates and methacrylates are examples of alpha-beta unsaturated esters. The alpha-beta unsaturated ester can include silicon; such as, for example, a polysiloxane containing an alpha-beta unsaturated ester.

"(Meth)acrylate" refers to a group consisting of methacrylates and acrylates, including silicon-containing molecules containing acrylate or methacrylate functionalities.

"Alkyl" is a hydrocarbon radical derived from an alkane by removal of a hydrogen atom. "Substituted alkyl" is an alkyl that has an atom, or chemical moiety, other than carbon and hydrogen in place of at least one carbon or hydrogen.

"Aryl" is a radical derived from an aromatic hydrocarbon by removal of a hydrogen atom. "Substituted aryl" is an aryl that has an atom, or chemical moiety, other than carbon and hydrogen in place of at least one carbon or hydrogen.

"Siloxane" refers to a molecule that contains at least one siloxane (Si—O—Si) linkage. "Polysiloxane" is a molecule that contains multiple Si—O—Si linkages. Polysiloxanes comprise siloxane units that are typically referred to as M, D, T or Q units. Standard M units have the formula $(CH_3)_3SiO_{1/2}$. Standard D units have the formula $(CH_3)_2SiO_{2/2}$. Standard T units have the formula $(CH_3)SiO_{3/2}$. Standard Q units have the formula $SiO_{4/2}$. M-type, D-type and T-type units can have one or more methyl group replaced with hydrogen, or some other moiety.

"Silyl hydrides" are molecules that contain a silicon-hydrogen (Si—H) bond and can contain multiple Si—H bonds.

A "Frustrated Lewis Pair", or "FLP", is a system of Lewis acids and Lewis bases in which steric congestion precludes the Lewis acid and Lewis base from complexing and completely neutralizing ("blocking") each other. FLPs are known in the art and have been characterized in articles such as JACS 2015, 137, 10018-10032 and the articles identified therein. Desirably, the FLP is a system of Lewis acids and Lewis bases in which congestion precludes their complexing and neutralizing at 20 degrees Celsius (° C.). While FLPs are known in the art, one can determine whether any Lewis pair is a FLP by combining at 20° C. equal molar amounts of the Lewis acid and Lewis base in a solvent that dissolves both. If more than 10 molar percent of the Lewis acid and Lewis base remain dissociated then the Lewis acid and Lewis base can be considered a FLP. Determine extent of dissociation by any means reasonable such as by nuclear magnetic resonance spectroscopy or, preferably ion chromatography using conductimetric or photometric detectors.

Upon heating compositions of the present invention, the B-FLP releases Lewis acid which catalyzes a reaction between the alpha-beta unsaturated ester and the silyl hydride. Heating the composition to a temperature of 80° C. or higher, 90° C. or higher, 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher and at the same time, generally 300° C. or lower, 250° C. or lower, 240° C. or lower, 230° C. or lower, 220° C. or lower, 210° C. or lower, 200° C. or lower, 175° C. or lower, 150° C. or lower, 140° C. or lower, 130° C. or lower, 120° C. or lower, 110° C. or lower, or even 100° C. or lower causes the components in the composition to react and cure in one hour or less, preferably 30 minutes or less, more preferably 10 minutes or less, even more preferably 5 minutes or less, yet more preferably 2 minutes or less, one minute or less, or even 30 seconds or less.

The reaction between a siloxane and silyl hydride is a rearrangement reaction generally represented by the following reaction:

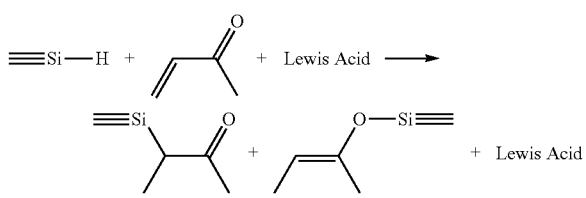

where two optional reaction products are shown. This reaction is useful to form new siloxane bonds and to form crosslinked polysiloxane systems.

The composition of the present invention is shelf stable. "Shelf stable" means that the composition does not form gel at 23° C. in 10 hours or less, preferably 15 hours or less, even more preferably 24 hours or less, and yet more preferably in 5 days or less.

Alpha-Beta Unsaturated Ester

The alpha-beta unsaturated ester has the following compositional structure (an alpha-beta unsaturated ester group) in one or more than one location in the molecule:

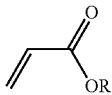

where R contains a carbon attached to the oxygen shown and can contain any other atom. As examples, R can be an alkyl, substituted alkyl, benzyl, or a polymeric group with a carbon connecting it to the oxygen.

Desirably, the alpha-beta unsaturated ester group can be part of a polymer. Such a polymer can contain one or more than one alpha-beta unsaturated ester group. The alpha-beta unsaturated ester is desirable selected from (meth)acrylates, that is, compounds having an acrylate and/or methacrylate group as shown below.

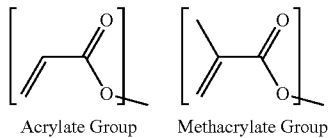

Acrylate Group    Methacrylate Group

The alpha-beta unsaturated ester group can be connected to a silicon atom, which is typically part of a siloxane group (Si—O—Si) or a polysilane group (Si—Si), which itself is typically part of a polysiloxane chain. When the alpha-beta unsaturated ester group connects to a silicon atom the connection between the oxygen and silicon is through one or multiple (generally 2 or more, 3 or more while at the same time 6 or fewer, 5 or fewer, even 4 or fewer) carbon atoms, through the single-bonded oxygen atom in the alpha-beta unsaturated ester group.

Examples of suitable alpha-beta unsaturated esters include methacrylate-pendant polysiloxanes such as those having the formula $MD_xD^{MA}_yM$, where $D^{MA}$ is a D-type siloxane unit where one of the methyl groups of a standard D siloxane unit is replaced with methacryloxypropyl:

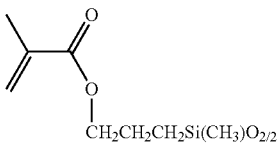

$CH_2CH_2CH_2Si(CH_3)O_{2/2}$ and where subscript x is the average number of D units per molecule and is a value of 10 or more, 20 or more, 30 or more, 40 or more, 50 or more, 60 or more, 70 or more, 80 or more, 90 or more, 100 or more, 110 or more, 120 or more, 130 or more, 140 or more, 150 or more, 160 or more, 170 or more, 180 or more, 190 or more and even 200 or more while at the same time is generally 1000 or less, 800 or less, 600 or less, 400 or less, or even 200 or less; and subscript y is the average number of $D^{MA}$ siloxane units per molecule and is a value of one or more, 2 or more, 3 or more, 4 or more, 5 or more, 6 or more, 7 or more, 8 or more, 9 or more, 10 or more, 12 or more, 14 or more, 16 or more 18 or more even 20 or more and at the same time is generally 50 or less, 40 or less, 30 or less, 20 or less or even 10 or less. Determine subscript values by $^{29}Si$ nuclear magnetic resonance spectroscopy.

Examples of suitable alpha-beta unsaturated esters that are methacryloxypropyl terminated polydimethylsiloxanes include those available from Gelest under the trade names DMS-R11 (125-250 cSt), DMS-R18 (50-90 cSt), DMS-R11 (8-14 cSt), and DMS-R31 (1,000 cSt) as well as acrylate functional silane available from Gelest under the name SIVATE™ A200.

Typically, the concentration of alpha-beta unsaturated ester in the composition is 70 weight-percent (wt %) or more, 75 wt % or more, 80 wt % or more, 85 wt % or more, even 90 wt % or more while at the same time is typically 90 wt % or less, 85 wt % or less, 80 wt % or less, or even 75 wt % or less based on the combined weight of silyl hydride, alpha-beta unsaturated ester and B-FLP.

Silyl Hydride

The silyl hydride contains one, preferably more than one, Si—H bond. The Si—H bond is typically part of polysilane (molecule containing multiple Si—H bonds) or polysiloxane. Silyl hydrides containing multiple Si—H bonds are desirable as crosslinkers in compositions of the present invention because they are capable of reacting with multiple alpha-beta unsaturated ester linkages.

The silyl hydride of the present invention can be polymeric. The silyl hydride can be linear, branched or can contain a combination of linear and branched silyl hydrides. The silyl hydride can be a polysilane, a polysiloxane or a combination of polysilane and polysiloxanes.

Desirably, the silyl hydride is a polysiloxane molecule with one or more than one Si—H bond. If the silyl hydride is a polysiloxane, the Si—H bond is on the silicon atom of an M-type or D-type siloxane unit. The polysiloxane can be linear and comprise only M ($\equiv SiO_{1/2}$) type and D ($=SiO_{2/2}$) type units. Alternatively, the polysiloxane can be branched and contain T (—$SiO_{3/2}$) type and/or Q ($SiO_{4/2}$) type units.

Examples of suitable silyl hydrides include pentamethyldisiloxane, bis(trimethylsiloxy)methyl-silane, tetramethyldisiloxane, tetramethycyclotetrasiloxane, and hydride terminated poly(dimethylsiloxane) such as those available from Gelest under the tradenames: DMS-H03, DMS-H25, DMS-H31, and DMS-H41.

The concentration of silyl hydride is typically sufficient to provide a molar ratio of Si—H groups to the combination of alpha-beta unsaturated ester groups that is 0.2 or more, 0.5 or more, 0.7 or more, 0.8 or more, 0.9 or more, 1.0 or more 1.2 or more, 1.4 or more, 1.6 or more, 1.8 or more, 2.0 or more, 2.2 or more, even 2.5 or more while at the same time is typically 5.0 or less, 4.5 or less, 4.0 or less, 3.5 or less, 3.0 or less, 2.8 or less, 2.5 or less, 2.3 or less, 2.0 or less, 1.8 or less, 1.6 or less, 1.4 or less, 1.2 or less or even 1.0 or less.

Either the alpha-beta unsaturated ester or the silyl hydride (or both) can serve as crosslinkers in the reaction. A crosslinker has at least two reactive groups per molecule and reacts with two different molecules through those reactive groups to cross link those molecules together. Increasing the linear length between reactive groups in a crosslinker tends to increase the flexibility in the resulting crosslinked product. In contrast, shortening the linear length between reactive groups in a crosslinker tends to reduce the flexibility of a resulting crosslinked product. Generally, to achieve a more flexible crosslinked product a linear crosslinker is desired and the length between reactive sites is selected to achieve desired flexibility. To achieve a less flexible crosslinked product, shorter linear crosslinkers or even branched crosslinkers are desirable to reduce flexibility between crosslinked molecules.

The silyl hydride can be the same molecule as the alpha-beta unsaturated ester—that is, a single molecule containing both an alpha-beta unsaturated ester and silyl hydride functionality can serve as both the silyl hydride and alpha-beta unsaturated ester. Alternatively, the silyl hydride can be a different molecule from the alpha-beta unsaturated ester. The silyl hydride can be free of alpha-beta unsaturated ester groups. The alpha-beta unsaturated ester can be free of silyl hydride groups.

The composition (and reaction process) of the present invention can comprise more than one silyl hydride, more than one alpha-beta unsaturated ester and/or more than one component that serves as both a silyl hydride and alpha-beta unsaturated ester.

Typically, the concentration of silyl hydride in the composition is 5 wt % or more, 10 wt % or more, 15 wt % or more, 20 wt % or more, even 25 wt % or more while at the same time is typically 30 wt % or less, 25 wt % or less, 20 wt % or less, 15 wt % or less or even 5 wt % or less based on the combined weight of silyl hydride, alpha-beta unsaturated ester and B-FLP.

Bridged Frustrated Lewis Pair

The Bridged Frustrated Lewis Pair ("B-FLP") is a complex comprising a FLP wherein a Lewis acid and a Lewis base of the FLP are both bound to a bridging molecule to form a neutralized complex with the bridging molecules residing between (that is, "bridging") the Lewis acid and Lewis base. The bridging molecule can severe, such as in the case of $H_2$, with a portion of the bridging molecule blocking the Lewis acid and another portion of the bridging molecule blocking the Lewis base. Alternatively, and preferably, the bridging molecule remains intact and the B-FLP is a stable complex (at least at 23° C.) with the bridging molecule simultaneously bound to the Lewis acid of the FLP and the Lewis base of the FLP.

The Lewis acid is selected from a group consisting of aluminum alkyls, aluminum aryls, aryl boranes including triaryl borane (including substituted aryl and triaryl boranes such as fluorinated aryl boranes including tris(pentafluorophenyl)borane), boron halides, aluminum halides, gallium alkyls, gallium aryls, gallium halides, silylium cations and phosphonium cations. Examples of suitable aluminum alkyls include trimethylaluminum and triethylaluminum. Examples of suitable aluminum aryls include triphenyl aluminum and tris-pentafluorophenyl aluminum. Examples of triaryl boranes include those having the following formula:

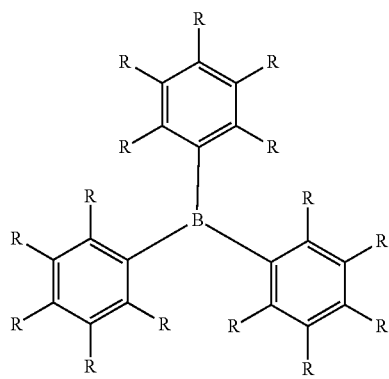

where R is independently in each occurrence selected from H, F, Cl and $CF_3$. Examples of suitable boron halides include $(CH_3CH_2)_2BCl$ and boron trifluoride. Examples of suitable aluminum halides include aluminum trichloride. Examples of suitable gallium alkyls include trimethyl gallium. Examples of suitable gallium aryls include triphenyl gallium. Examples of suitable gallium halides include trichlorogallium. Examples of suitable silylium cations include $(CH_3CH_2)_3Si^+X^-$ and $Ph_3Si^+X^-$. Examples of suitable phosphonium cations include $F—P(C_6F_5)_3^+X^-$.

The Lewis base is selected from a group consisting of the following bases: $PR_3$, $P(NR_2)_3$, $NR_3$, $N(SiR_3)_xR_{3-x}$, $RC(NR)N$, $P(N—R)R_3$, guanidines ($C(=NR)(NR_2)_2$), amidines ($RC(=NR)NR_2$), phosphazenes, and

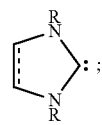

where R is in each occurrence independently selected from a group consisting of hydrogen, alkyl, substituted alkyl, aryl and substituted aryl. Examples of suitable Lewis basis of the structure $PR_3$ include tri(t-butyl)phosphine, tri(cyclohexyl) phosphine, $PhP(tBu)_2$; $(cylcohexyl)P(tBu)_2$; $nBuP(tBu)_2$; $Me(tBu)_2$; $tBuP(i-Pr)_2$; $P(C_6H_{11})_3$; $P(iBu)_3$; and $P(n-Bu)_3$. Examples of suitable Lewis basis of the structure $RC(NR)N$ include 1,5,7-Triazabicyclo[4.4.0]dec-5-ene; 7-Methyl-1,5,7-triazabicyclo4.4.0dec-5-ene; 2,3,4,6,7,8,9,10-Octahydropyrimidol[1,2-a]azepine, (DBU). Examples of suitable guanidines include guanidine, biguanidine, and 1,1-dimethylguanidine. Examples of suitable amidines include diethylamide, and di-isopropyl amide. Examples of suitable phosphazenes include tert-Butylimino-tri(pyrrolidino)phosphorene; tert-Octylimino-tris(dimethylamino)phosphorene; and 2-tert-butylimino-2-diethylamino-1,3-dimethylperhydro-1,3,2-diazaphosphorine. Examples of suitable Lewis basis of the structure

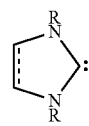

include 1,3-dimesityl-imidazol-4,5-dihydro-2-ylidene; 1,3-Bis(2,6-diisopropylphenyl)imidazol-2-ylidene; and 1,3-Bis (2,4,6-trimethylphenyl)-4,5-dihydroimidazol-2-ylidene.

The bridging molecule, in the broadest scope of the present invention, includes any molecule that will simultaneously bind and block the Lewis acid and Lewis base of a FLP to form a B-FLP. The interaction of the bridging molecule with the Lewis acid and Lewis base is such that the Lewis acid and Lewis base is blocked by the bridging molecule (or portion thereof) at 23° C. but unblocks at least the Lewis acid at temperatures of 120° C. or higher, preferably 110° C. or higher, more preferably 100° C. or higher, even more preferably 90° C. or higher, 80° C. or higher, or even 70° C. or higher and at the same time desirably 300° C. or lower, 240° C. or lower, 220° C. or lower, 200° C. or lower, 180° C. or lower, 160° C. or lower, 150° C. or lower, 125° C. or lower or even 100° C. or lower. Unblocking of the Lewis acid of the B-FLP can be evidenced by a composition of the present invention containing the B-FLP curing in less than 1/10$^{th}$ the time required for it to gel at 23° C.

Examples of suitable bridging molecules include carbon dioxide, hydrogen molecule ($H_2$), nitriles, alkenes, alkynes, ketones, esters and aldehydes. Desirably, the bridging molecule contains 10 or fewer, preferably 9 or fewer and can contain 8 or fewer, 7 or fewer, 6 or fewer, 5 or fewer, 4 or fewer, 3 or fewer, 2 or fewer and even one or fewer or zero carbon atoms; while at the same time the bridging molecule can contain one or more, 2 or more, 3 or more, 4 or more, 5 or more and even 6 or more carbon atoms. As noted earlier herein, some bridging molecules can sever in the B-FLP with a portion of the bridging molecule blocking the Lewis acid and a portion of the bridging molecule blocking the Lewis base. It is preferable for the bridging molecule to remain non-severed while bridging the Lewis acid and Lewis base of a FLP. In that regard, the bridging molecule preferably is not hydrogen ($H_2$). More preferably, the bridging molecule does not include any molecules that sever while bridging the Lewis acid and Lewis base of a FLP.

The B-FLP is desirably "stable" in the composition of the present invention, which means it does not dissociate to release Lewis acid, at temperatures of 23° C. and lower. The B-FLP can be stable at temperatures of 30° C. or lower, 50° C. or lower, 70° C. or lower, even 80° C. or lower. At the same time, the B-FLP dissociates at temperatures of 120° C. and higher, preferably 110° C. and higher, more preferably 110° C. and higher, 100° C. and higher, 90° C. and higher and even 80° C. and higher. Determine if the B-FLP dissociates by looking for evidence of free Lewis acid by nuclear magnetic resonance spectroscopy ($^{1}H$ and $^{31}P$, $^{11}B$ and/or $^{27}Al$ as appropriate depending on the Lewis acid). Alternatively, dissociation of the B-FLP can be detected by a composition curing faster than the identical composition without B-FLP at a given temperature.

One method for preparing the B-FLP is by combining the Lewis acid and Lewis base of a FLP together with a bridging molecule in a solvent at 23° C. Mixing facilitates formation of the B-FLP. The B-FLP can usually be isolated from the solvent by evaporating the solvent or, if the B-FLP precipitates out from the solvent then by filtration. The B-FLP can be stored for extended periods of time at 23° C. and lower. The B-FLP can be combined with a silyl hydride and a siloxane to form the composition of the present invention.

Compositions of the present invention typically contain enough B-FLP to provide a concentration of Lewis acid that is 0.1 weight part per million weight parts (ppm) or more, one ppm or more, 10 ppm or more, 50 ppm or more, 100 ppm or more, 200 ppm or more 300 ppm or more, 400 ppm or more, 500 ppm or more, 600 ppm or more, 700 ppm or more, 800 ppm or more, 900 ppm or more 1000 ppm or more while at the same time typically 10,000 ppm or less, 5,000 ppm or less, 1,000 ppm or less based on combined weight of silyl hydride and alpha-beta unsaturated ester in the composition.

In contrast to typical blocked Lewis acid systems, the Lewis acid of the B-FLP of the present invention is complexed with a Lewis base through a bridging molecule so it is complexed with two molecules. Prior art has suggested complexing a Lewis acid directly with a blocking agent that is sensitive to ultraviolet (UV) light so upon irradiation with UV light the blocking agent dissociates from the Lewis acid. The B-FLP of the present invention does not require a UV light sensitive blocking agent and can be free of such can be free of components that cause the Lewis acid to be freed from the B-FLP upon irradiation of UV light. The B-FLP and composition of the present invention can be free of photoacid generators and can be free of any other components that upon exposure to UV radiation generates a Lewis acid.

Compositions of the present invention offer the advantage of a one-component reactive system that is shelf stable even when exposed to UV light. Unlike prior art, the composition does not require UV light to react, nor does the composition need to be blocked from exposure to UV light to remain shelf stable. Desirably, the stability of B-FLPs of the present invention do not depend on (that is, is independent from) exposure to UV light.

The composition of the present invention can be free of water. Alternatively, the composition of the present invention can comprise water, preferably at a concentration of one weight-percent (wt %) or less, 0.75 wt % or less, 0.5 wt % or less, 0.25 wt % or less 0.1 wt % or less, 0.05 wt % or less or even 0.01 wt % or less based on composition weight.

Optional Components

Compositions of the present invention can consist of the silyl hydride, the alpha-beta unsaturated ester, and the Bridged Frustrated Lewis Pair. Alternatively, the compositions of the present invention can further comprise one or a combination of more than one optional component. Optional components are desirably present at a concentration of 50 wt % or less, 40 wt % or less, 30 wt % or less, 20 wt % or less, 10 wt % or less, 5 wt % or less, or even one wt % or less based on composition weight.

Examples of possible optional components include one or a combination of more than one component selected from a group consisting of hydrocarbyl solvents (typically at a concentration of 10 wt % or less, 5 wt % or less, even one wt % or less based on composition weight), pigments such as carbon black or titanium dioxide, fillers such as metal oxides including SiO2 (typically at a concentration of 50 wt % or less based on composition weight), moisture scavengers, fluorescent brighteners, stabilizers (such as antioxidants and ultraviolet stabilizers), and corrosion inhibitors. The compositions of the present invention also can be free of any one or any combination of more than one such additional components.

Notably, the composition of the present invention can contain one wt % or less, 0.5 wt % or less water relative to composition weight. Desirably, the composition is free of water.

Chemical Reaction Process

The present invention includes a chemical reaction process comprising the steps of: (a) providing a composition of the present invention; and (b) heating the composition to a temperature sufficient to dissociate the Lewis acid from the B-FLP. Upon heating the composition of the present, Lewis acid is released from the B-FLP and catalyzes a reaction between the silyl hydride and alpha-beta unsaturated ester as described previously above. The composition of the present invention can be provided in step (a) by mixing together a B-FLP, a silyl hydride and an alpha-beta unsaturated ester. As noted above, the silyl hydride and alpha-beta unsaturated ester can be the same molecule.

The chemical reaction process can be run in an absence of water or with a concentration of water that is one weight-percent (wt %) or less, 0.75 wt % or less, 0.5 wt % or less, 0.25 wt % or less 0.1 wt % or less, 0.05 wt % or less or even 0.01 wt % or less based on weight of the composition provided in step (a).

The composition has application, for example, as coatings that undergo thermally triggered cure reactions or as reactive compositions for molding applications where a fluid is disposed within a mold and heated to trigger a cure to form a molded article. In such applications, the process of the present invention would further include a step after step (a) and prior to step (b) where the composition is applied to a substrate or placed in a mold.

EXAMPLES

Materials $MD_{50}D^{MA}{}_{2.6}M$ has the following structure:

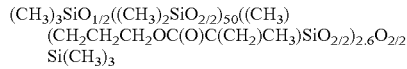

Prepare $MD_{50}D^{MA}{}_{2.6}M$ in the following manner: Equip a 4-neck one-liter flask with a thermal couple, a mechanical stirrer, a Dean Stark trap adapted water cooled condenser and nitrogen bubbler. Charge to the flask 466.6 g of silanol terminated polydimethylsiloxane (XIAMETER™ PMX-0930 available from The Dow Chemical Company), 75.8 g of 3-methacryloxypropylmethyldimethoxysilane (Gelest), 21.4 g of Dow corning 200 fluid (0.65 cSt), and 124 g of heptane. While vigorously stirring, add 0.40 milliliters (mL) of triflic acid to the flask. Heat to 76° C. Collect water, methanol and heptane in the Dean Stark trap. The refluxing temperature rises to 117° C. after about 4 hours. Remove the heat source and add 15.6 g of calcium carbonate and 32 g of sodium sulfate to the flask at a solution temperature of 101° C. Cool the pot temperature to 23° C. Stir the flask contents for 2 hours and then filter the flask contents through a 0.45 micrometer filter membrane. Rotovap the filtrate at 80° C. and less than one torr pressure for 30 minutes to obtain 456.7 g of $MD_{50}D^{MA}{}_{2.6}M$ as a clear and colorless liquid.

$MD166D^{MA}{}_{14}M$ has the following structure:

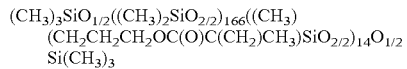

Prepare $MD_{166}D^{MA}{}_{14}M$ in the following manner: Equip a 4-neck one-liter flask with a thermal couple, a mechanical stirrer, a Dean Stark trap adapted water cooled condenser and nitrogen bubbler. Charge to the flask 558.9 g of silanol terminated polydimethylsiloxane (XIAMETER™ PMX-0930 available from The Dow Chemical Company), 18.5 g of 3-methacryloxypropylmethyldimethoxysilane (Gelest), 6.1 g of Dow Corning 200 Fluid (0.65 cSt) and 121 g of heptane. While vigorously stirring, add 0.35 milliliters (mL) of triflic acid to the flask. Heat to 73° C. Collect water, methanol and heptane in the Dean Stark trap. The refluxing temperature rises to 90° C. after about one hour. Add 11.0 g of water to the flask and continue the azeotropic distillation process. The refluxing temperature rises to 96° C. after about 2 hours. Remove the heat source and add 22.8 g of calcium carbonate and 50 g of sodium sulfate to the flask. Cool the pot temperature to 23° C. Stir the flask contents for three hours and then filter the flask contents through a 0.45 micrometer filter membrane. Rotovap the filtrate at 80° C. and less than one torr pressure for one hour to obtain 586.9 g of $MD_{166}D^{MA}{}_{14}M$ as a clear and colorless liquid.

$MD^{H}{}_{65}M$ has the following structure:

and is obtainable by the following process: Fit a 3-necked flask with a mechanical stirrer and add 40 grams (g) deionized water, 10 g heptane and 0.05 g tosylic acid. Add to this dropwise while stirring a mixture of 200 g methyldichlorosilane and 10 g trimethylchlorosilane over 30 minutes. Stir for an additional 60 minutes at 23° C. Wash the reaction solution three times with 50 milliliters (mL) deionized water each time. Dry the solution with anhydrous sodium sulfate and filter through activated carbon. Remove volatiles by Rotovap to obtain $MD^{H}{}_{65}M$ Silyl Hydride.

B-FLP(1). Working in a glovebox, place in a Schlenk flask equipped with a magnetic stir bar tri(t-butyl)phosphine (200 milligrams (mg), 1.0 millimole (mmol), 1 equivalent (equiv)) and tris-pentafluorophenylborane (500 mg, 1 mmol, 1 equiv) and dissolve the components in 10 milliliters (mL) of toluene. Seal the Schlenk flask and remove from the glovebox. Connect the Schlenk flask to a Schlenk line. Stir the contents of the Schlenk flask throughout the following step. Purge the Schlenk line with nitrogen and then bubble carbon dioxide through the line for two minutes. Open the Schlenk flask to the atmosphere of carbon dioxide and then replace the cap to the flask with a septum. Insert a needle through the septum to create an exit for the carbon dioxide gas and improve carbon dioxide circulation. After 5 minutes a white solid precipitates from the reaction mixture. Seal the flask and stir at room temperature for an additional hour. Move the flask to a glovebox. Add 20 mL of hexane and isolate the white solid by filtration through a glass frit. Wash the white solid with hexane three times (10 mL each time). The white solid is B-FLP(1) (540 mg, 71% yield). B-FLP(1) can be stored without decomposition even when exposed to UV light. Characterize the solid by $^1H$, $^{31}P$ and $^{11}B$ nuclear magnetic resonance spectroscopy (NMR) to confirm the absence of impurities and starting materials. The expected reaction and structure of B-FLP(1) is as follows:

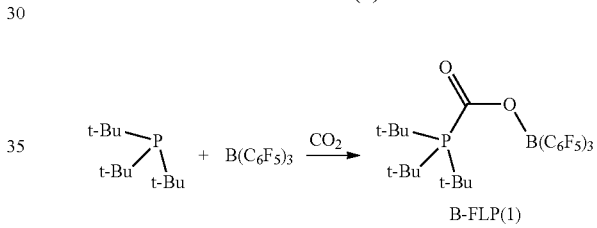

B-FLP(1)

Cure Time Methods

To determine cure (gel) time at 23° C., monitor a reaction composition prepared and stored at 23° C. until the composition becomes a gel. Cure time is the time required to form a gel. Determine when a sample gels by monitoring its flowability. Check the flowability of the contents of the vial at by inverting the vials and watching the contents to determine if it flows. Check flowability on hour intervals for 8 hours and after than on 24 hour intervals. Record the time at which gelation occurs as evidenced by a failure of the vial contents to flow in 1-2 seconds upon inverting. During the test, the composition are open to ambient (including ultraviolet) light.

To determine cure time at 90° C., draw down a 125 micron film of reaction composition onto a glassine release film substrate and place into an oven at 90° C. The time it takes the film to become a gel at 90° C.

Comparative Example (Comp Ex) A: Reactants without Lewis Acid

Combine 1.68 g of $MD^{H}{}_{65}M$ and 10 g of $MD_{50}D^{MA}{}_{2.6}M$ in a dental cup and mix to form a mixture having a molar ratio of Si—H to alpha-beta unsaturated ester group of 3. The resulting mixture takes more than 5 days to cure at 23° C. and fails to cure in one hour at 90° C.

Comp Ex A illustrates that the silyl hydride and alpha-beta unsaturated ester fail to cure at 23° C. or 90° C. on their own.

Comp Ex B: Reactants with tris-pentafluorophenylborane

Combine 1.68 g of $MD^H{}_{65}M$ and 10 g of $MD_{50}D^{MA}{}_{2.6}M$ in a dental cup and mix to form a mixture having a molar ratio of Si—H to alpha-beta unsaturated ester group of 3. Add 500 weight parts tris-pentafluorophenylborane dissolved in toluene per one million weight parts mixture to form a reaction composition. The resulting reaction composition cures in 4-5 hours at 23° C. and in 5 minutes at 90° C.

Comp Ex B illustrates that the silyl hydride and alpha-beta unsaturated ester is not shelf stable at 23° C. in the presence of 500 ppm Lewis acid catalyst.

Example (Ex) 1

Combine 1.68 g of $MD^H{}_{65}M$ and 10 g of $MD_{50}D^{MA}{}_{2.6}M$ in a dental cup and mix to form a mixture. Add enough B-FLP(1) (dissolved in toluene) to provide 500 weight parts tris-pentafluorophenylborane per one million weight parts mixture to form a reaction composition having a molar ratio of Si—H to alpha-beta unsaturated ester group of 3. The resulting reaction composition cures in more than 5 days at 23° C. and in 20 minutes at 90° C. Ex 1 illustrates that by introducing the Lewis acid as a B-FLP the reaction mixture is shelf stable at 23° C. but still reacts quickly at 90° C.

Ex 2

Combine 1.68 g of $MD^H{}_{65}M$ and 10 g of $MD_{166}D^{MA}{}_{14}M$ in a dental cup and mix to form a mixture having a molar ratio of Si—H to alpha-beta unsaturated ester group of 3. Add enough B-FLP(1) (dissolved in toluene) to provide 500 weight parts tris-pentafluorophenylborane per one million weight parts mixture to form a reaction composition. The resulting reaction composition cures in more than 5 days at 23° C. and in 20 minutes at 90° C. Ex 2 illustrates that by introducing the Lewis acid as a B-FLP the reaction mixture is shelf stable at 23° C. but still reacts quickly at 90° C.

What is claimed is:

1. A composition comprising a mixture of silyl hydride, alpha-beta unsaturated esters, and a Bridged Frustrated Lewis Pair.
2. The composition of claim 1, wherein the Bridged Frustrated Lewis Pair comprises:
   (a) a Lewis acid selected from a group consisting of aluminum alkyls, aluminum aryls, fluorinated aryl borane, boron halides, aluminum halides, gallium alkyls, gallium aryls, gallium halides, silylium cations and phosphonium cations;
   (b) a Lewis base selected from a group consisting of molecules having the following structures: $PR_3$, $P(NR_2)_3$, $NR_3$, $N(SiR_3)xR_{3-x}$, $RC(NR)N$, $P(N—R)R_3$ guanidines, amidines, phosphazenes, and

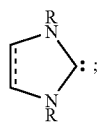

and
   where R is in each occurrence independently selected from a group consisting of hydrogen, alkyl, substituted alkyl, aryl and substituted aryl; and
   (c) a bridging molecule connecting the Lewis acid and Lewis base, the bridging molecule selected from a group consisting of carbon dioxide, $H_2$, nitriles, alkenes, alkynes, esters, esters and aldehydes.
3. The composition of claim 2, wherein the Lewis acid is a fluorinated aryl borane.
4. The composition of claim 2, wherein the Lewis base is selected from a group consisting of $PR_3$, $NR_3$, guanidines, amidines and phosphazenes.
5. The composition of claim 2, wherein the bridging molecule is selected from a group consisting of carbon dioxide, nitrile, $H_2$, alkynes and alkenes.
6. The composition of claim 2, wherein the Lewis acid is a fluorinated aryl borane, the Lewis base is selected from a group consisting of $PR_3$ and $NR_3$ and the bridging molecule is selected from a group consisting of carbon dioxide and nitriles; where R is in each occurrence independently selected from a group consisting of hydrogen, alkyl, substituted alkyl, aryl and substituted aryl.
7. The composition of claim 1, wherein the composition is free of transition metals.
8. The composition of claim 1, wherein the alpha-beta ester is one or a combination of more than one (meth) acrylate.
9. A chemical reaction process comprising the steps of:
   (a) providing a composition comprising a mixture of silyl hydride, alpha-beta unsaturated esters, and a Bridged Frustrated Lewis Pair; and
   (b) heating the composition to a temperature sufficient to dissociate Lewis acid from the Bridged Frustrated Lewis Pair.
10. The process of claim 9, wherein step (a) comprises mixing together a Bridged Frustrated Lewis Pair, a silyl hydride and an alpha-beta ester.
11. The process of claim 9, wherein after step (a) and prior to step (b) the composition is applied to a substrate or placed in a mold.
12. The process of claim 10, wherein after step (a) and prior to step (b) the composition is applied to a substrate or placed in a mold.
13. The composition of claim 3, wherein the Lewis base is selected from a group consisting of $PR_3$, $NR_3$, guanidines, amidines and phosphazenes.
14. The composition of claim 3, wherein the bridging molecule is selected from a group consisting of carbon dioxide, nitrile, $H_2$, alkynes and alkenes.
15. The composition of claim 4, wherein the bridging molecule is selected from a group consisting of carbon dioxide, nitrile, $H_2$, alkynes and alkenes.
16. The composition of claim 2, wherein the composition is free of transition metals.
17. The composition of claim 4, wherein the composition is free of transition metals.
18. The composition of claim 5, wherein the composition is free of transition metals.
19. The composition of claim 6, wherein the composition is free of transition metals.
20. The composition of claim 2, wherein the alpha-beta ester is one or a combination of more than one (meth) acrylate.

* * * * *